United States Patent [19]
Staker

[11] Patent Number: 5,963,777
[45] Date of Patent: Oct. 5, 1999

[54] HYPEREUTECTOID AND HYPOEUTECTIC BINARY URANIUM-VANADIUM ALLOYS

[75] Inventor: Michael R. Staker, Churchville, Md.

[73] Assignee: The United States of America as represented by the Secretary of the Army, Washington, D.C.

[21] Appl. No.: 09/009,985

[22] Filed: Jan. 21, 1998

[51] Int. Cl.$^6$ .................................................. C22C 43/00
[52] U.S. Cl. .............................. 420/3; 148/557; 148/560; 148/401
[58] Field of Search ................................. 420/3; 148/557, 148/560, 401

[56] References Cited

U.S. PATENT DOCUMENTS 3,773,569  11/1973  Edelman et al. .
3,969,160   7/1976  Hemperly .
3,981,722   9/1976  Ray et al. .

OTHER PUBLICATIONS

Uranium and Uranium Alloys, K.H. Eckelmeyer, Metals Handbook, Ninth Edition, vol. 9, American Society for Metals, Metals Park, OH, p. 476 (1985).

The Mechanical Propeties of Quenched Uranium–Molybdenum Alloys, R. F. Hills, B.R. Butcher & .W. HowlettPart I Tensile Tests on Polycrystalline Specimens, J. Nucl. Mater, 11, pp. 149–162 (1964).

The Mechanical Properties of Quenched Uranium–Molybdenum Alloys, B.R. Butcher & B.A. Hart, Part II A Preliminary Survey of the Deformation Mechanisms, J. Nucl. Mater, 11, pp. 163–182 (1964).

Physical Metallurgy iof Uranium Alloys, K.H. Eckelmeyer, Brook Hill, Chestnut Hill, MA, p. 463, (1976).

The Uranium–Vanadium Equilibrium Phase Diagram M.R. Staker, J. Alloys Compounds, 266,pp. 167–179 (1998).

Primary Examiner—Ngoclan Mai
Attorney, Agent, or Firm—Paul S. Clohan, Jr.; U. John Biffoni

[57] ABSTRACT

Binary alloys of uranium and vanadium having high hardness and strength prepared by selectively adjusting both the composition of the alloy and the solutionization temperature between the gamma-eutectoid and the eutectic points.

19 Claims, 3 Drawing Sheets

HYPEREUTECTOID AND HYPOEUTECTIC BINARY URANIUM-VANADIUM ALLOYS

The invention described herein may be manufactured, used and licensed by or for the U.S. Government without the payment to us of any royalty thereon.

FIELD OF THE INVENTION

The present invention relates to a family of alloys of uranium with remarkable properties for use as structural materials and for other uses. These alloys consist essentially of binary alloys of uranium and vanadium, having a wide range of hardnesses and strengths, and are available in the solutionized and quenched condition.

DESCRIPTION OF THE PRIOR ART

Typical alloys of uranium have been hardened via a heat-treatment sequence consisting of:

(a) a solutionization step whereby the alloying addition (typically Mo, Nb, Zr, Ti) is put into substitutional solid solution of the elevated temperature phase of uranium, gamma, (b) a quench step that cools the alloy rapidly enough to capture the solid solution for which the solubility is very low at room temperature, and causes the martensitic transformation of gamma to alpha prime by a diffusionless transformation of the body centered cubic (BCC) gamma phase to the slightly distorted base-centered orthorhombic phase, alpha prime;

(c) and a final aging step that precipitates, from the supersaturated alpha prime, a second phase, an intermetallic compound of stoichiometric composition between uranium and the alloying element such as $U_2Mo$ or $U_2Ti$, etc. The aging step increases the hardness and strength substantially over the as-quenched martensite from approximately 37 to the range of 44–48 HRC.

In addition to the above strengthening mechanism whereby the martensitic structure becomes a two phase structure, there are compositionally induced changes in the strength of the as-quenched martensite, depending on the composition of the gamma phase prior to the quench. These are shown in FIGS. 1 and 2. These changes in hardness and strength of the as-quenched microstructure are a function only of the composition and are not dependent on any other phase changes such as precipitation reactions. They are directly relatable to the composition of the gamma phase prior to quenching, as there is no change in composition of any of the phases during the quench, i.e., gamma to alpha prime. Since these as-quenched hardnesses and strength levels are not high enough for the requirements of some structural applications, an aging heat-treatment is usually required to achieve the desired hardness level. This aging treatment usually requires a trade-off between strength and ductility because of the type of precipitate formed during precipitation hardening. The compositionally induced solid solution strengthening of the as-quenched martensite does not necessarily require this trade-off.

The present invention of a family of uranium alloys using only vanadium as the intentional alloying element has the advantage of attaining the entire range of hardnesses from 36 to 54 HRC in as-quenched alloys. No processing by aging for precipitation reactions are necessary because the hardness and strength of the as-quenched microstructures are sufficient. The desired as-quenched hardness can be selected according to the temperature of solutionization and the composition of the alloy.

It is an object of the present invention to provide and disclose a family of uranium-vanadium alloys having high hardness and strength.

It is an object of the present invention to provide and disclose a family of uranium-vanadium alloys having high hardness and strength without aging the alloys for precipitation hardening.

It is an object of the present invention to provide and disclose a family of uranium-vanadium alloys allowing a range (from low to high) of hardnesses and strengths without aging by adjusting the composition of the alloy within this family.

It is a further object of the present invention to provide and disclose a method for the production of a family of uranium-vanadium alloys allowing a range (from low to high) of hardnesses and strengths without aging by adjusting the composition of the alloy and/or selecting the temperature of the solutionization.

Other objects and a fuller understanding of the invention may be ascertained from the following description and claims.

DETAILED DESCRIPTION OF THE INVENTION

Figure 1:
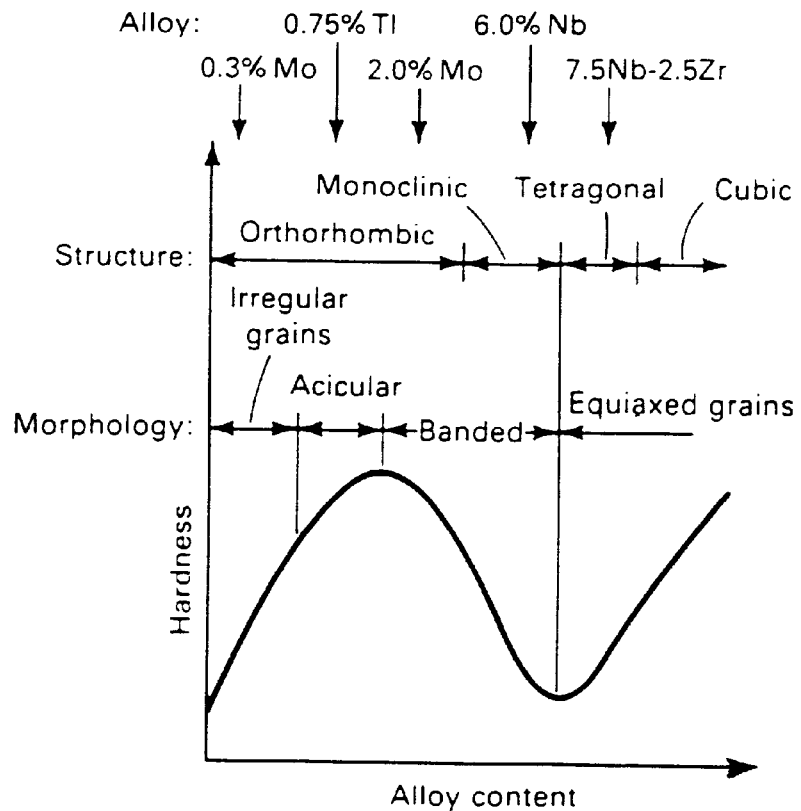
FIG. 1 is a graph of Hardness as a function of Alloy Content, taken from the literature, for various uranium alloys which also indicates the various microstructures.
Figure 2:
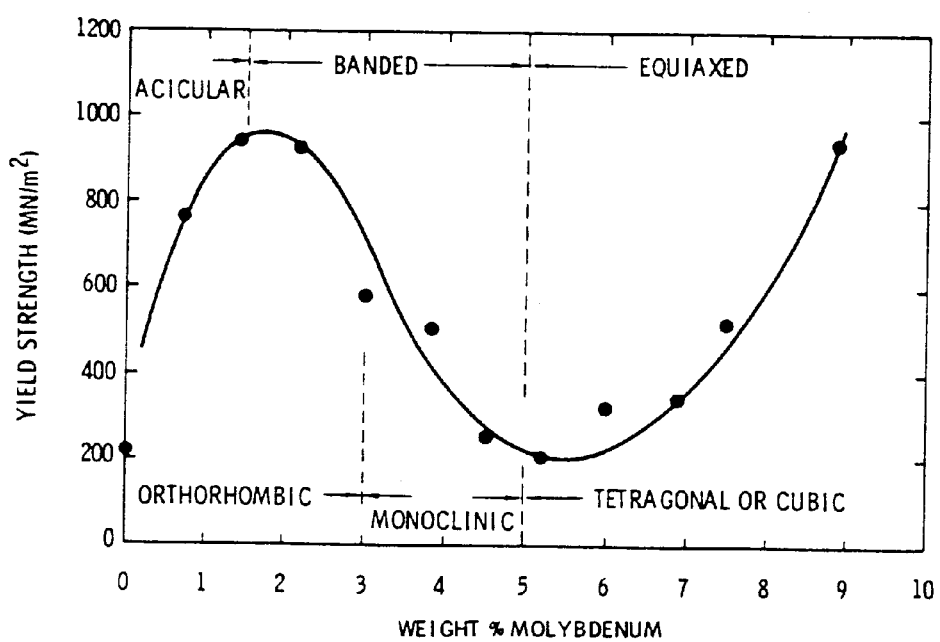
FIG. 2 is a graph of Yield Strength as a function of percent Molybdenum, taken from the literature, for a uranium-molybdenum alloy.
Figure 3:
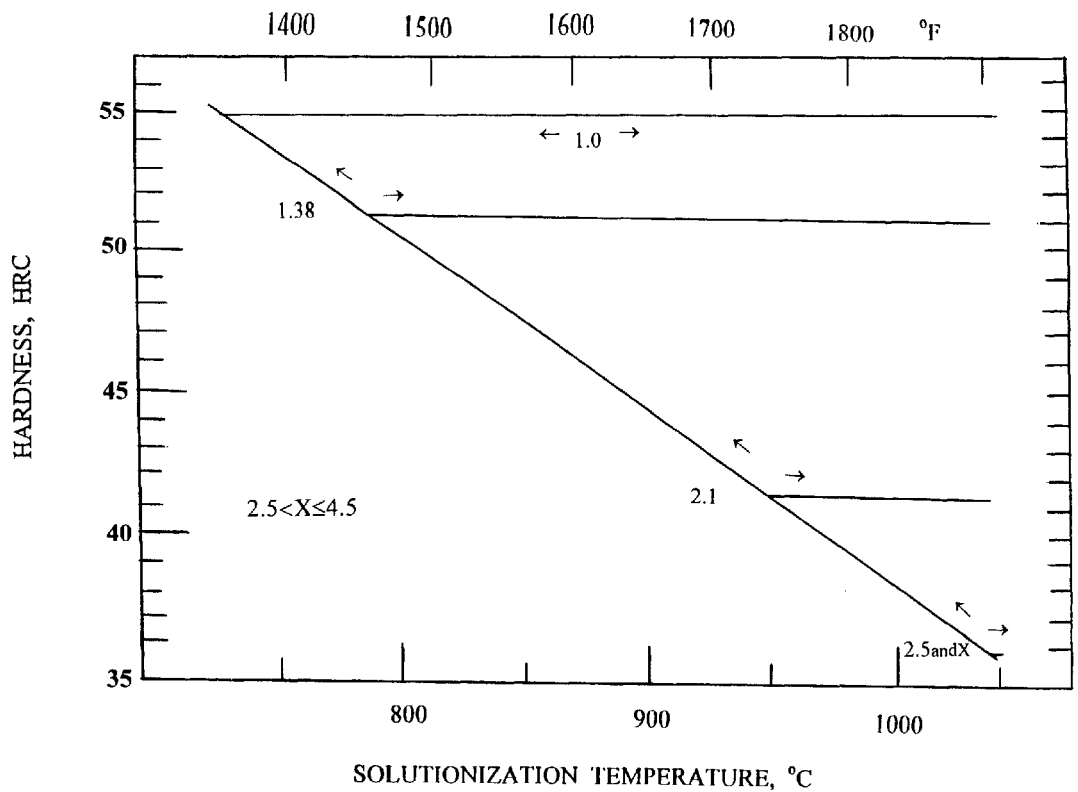
FIG. 3 is a graph of Hardness as a function of Solutionization Temperature for various hypereutectoid uranium-vanadium alloys.
Figure 5:
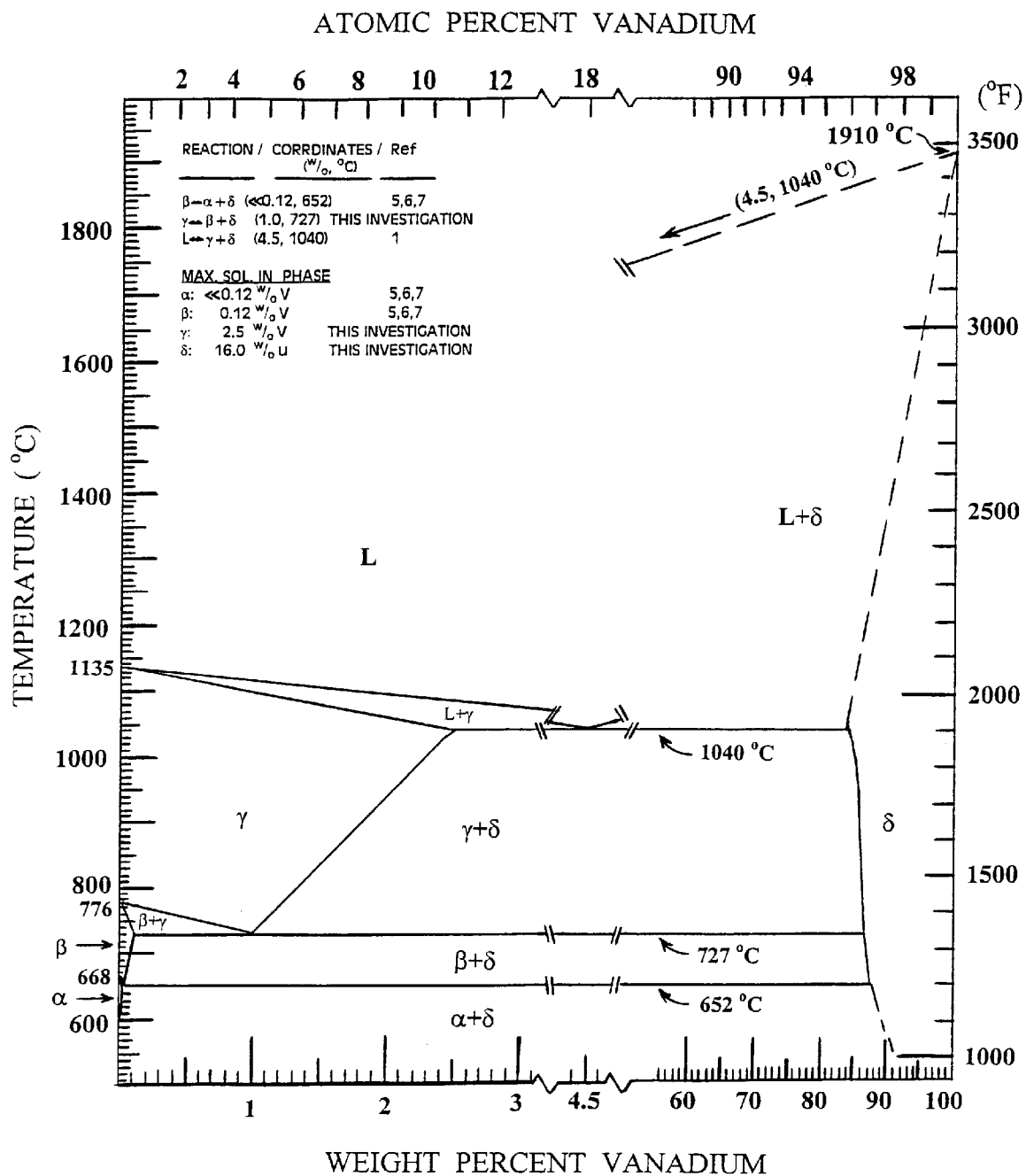
FIG. 5 is the correct phase diagram of uranium-vanadium alloys showing the various phases present at various temperatures and compositions.

The family of uranium-vanadium alloys of this invention have a range of hardnesses and strengths that are attainable without an aging process by adjusting the composition between the gamma eutectoid (1.0 percent on a weight basis) and the eutectic composition (4.5 percent on a weight basis) and by selecting the solutionization temperature between the gamma eutectoid (727 degrees C.) and the eutectic (1040 degrees C.) temperature. The resulting hardnesses are shown in FIG. 3 for various alloys of this invention with selected vanadium compositions. This figure is the result of a compositionally induced change in the strength of the as-quenched martensite. This change in the martensite results from the fact that the composition of the gamma phase, during solutionization and just prior to quench, must assume that of the gamma/(gamma plus delta) line from the phase diagram shown in FIG. 5 (taken from reference 5). FIG. 3 demonstrates some of the preferred embodiments of this invention, the method of adjusting the composition and selecting the temperature of solutionization to achieve a desired hardness and strength. All of the compositions in the range between 1.0 and 4.5 percent on a weight basis demonstrate high hardness (54 HRC) if solutionization is carried out just above the gamma eutectiod, i.e. about 730 degrees C., whereas lower hardnesses (as low as 36 HRC) are obtained by a higher solutionization temperature, as discussed below.

In addition to the compositions shown on FIG. 3, any given composition of this invention can be inlayed as a horizontal line intersecting the diagonal line at the solutionization temperature but proportionately adjusted between those already indicated. The solutionization temperature for the vanadium composition is determined from the phase diagram of FIG. 5 by a vertical line at the desired composition which intersects the gamma/(gamma plus delta) line yielding the proper solutionization temperature. Then FIG. 3 is used for the corresponding hardness.

The microstructures that result from these solutionization and quench processes are of two types: one is all martensite, and the other is a two phase microstructure of mostly martensite with a small amount of pre-quench delta. The all martensite structure results from alloys with vanadium contents between the gamma eutectiod composition (1.0 percent on a weight basis) and the maximum solubility composition for gamma uranium (2.5 percent on a weight basis) and which have a solutionization temperature above the gamma/(gamma plus delta) phase line, i.e. gamma solutionized. These are single phase hypereutectoid alloys. The martensite (alpha prime) plus delta microstructures result from alloys with vanadium contents between gamma eutectoid composition and the eutectic composition (4.5 percent on a weight basis) and which have a solutionization temperature above 727 degrees C. but below or to the right (richer vanadium contents) of the gamma/(gamma plus delta) phase line in the phase diagram, i. e., within the gamma plus delta field. These are two phase hypereutectoid alloys. Some of these latter alloys (those with compositions between 2.5 and 4.5 percent by weight) are hypoeutectic alloys.

Figure 4:
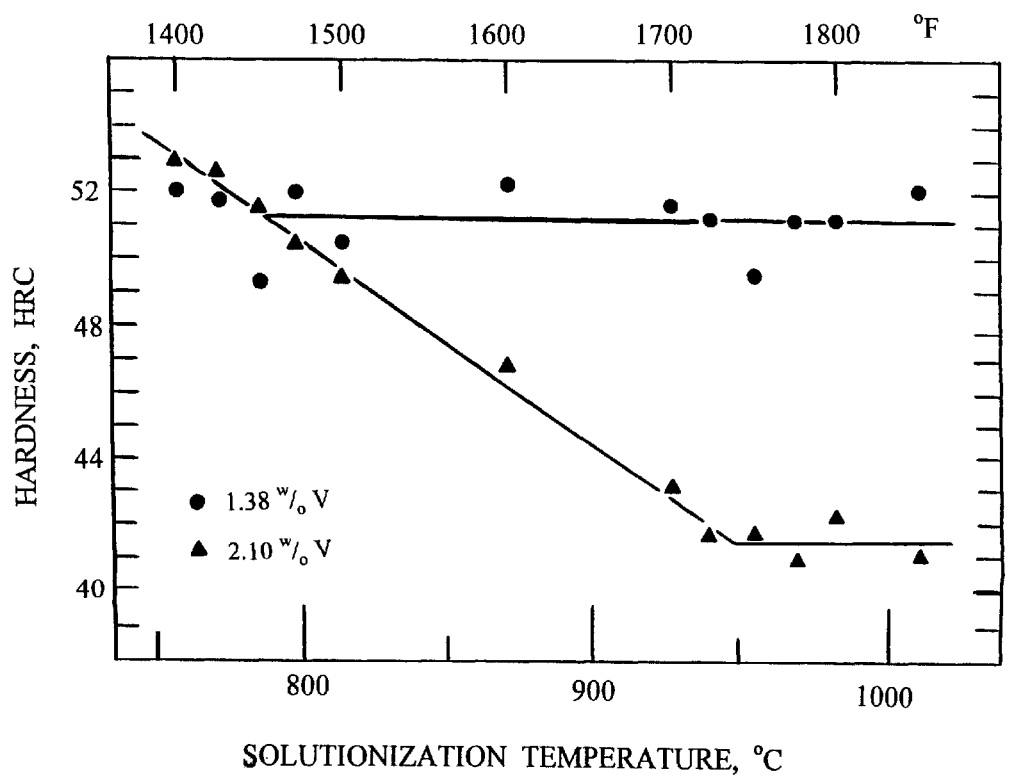
FIG. 4 is a graph of Hardness as a function of Solutionization Temperature for two hypereutectoid uranium-vanadium alloys.

The presence of the vanadium-rich terminal phase (delta) in reasonable quantities, before and after the quench, is shown in this invention not to alter properties such as hardness and strength of the as-quenched martensite. This is seen in FIG. 4. where the two alloys of 1.38 and 2.1 weight percent vanadium have the same hardness when the solutionization temperature was in the range of approximately 760° to 788° C. This is because the hardness and strength of these alloys (regardless of composition) is governed by the composition of the gamma prior to the quench, which is determined by the phase diagram according to reference 5 and shown in FIG. 5. The line of maximum solubility of vanadium in gamma, i.e. the gamma/(gamma plus delta) line, is in the here-to-fore unknown position defined by the two points with coordinates of (1.0, 727) and (2.5, 1040) where the first number in each bracket is the composition in weight percent vanadium and the second number is the temperature in degrees Celsius. One embodiment of this invention is the alloys of uranium that are in the two phase region of gamma plus delta yet have the gamma composition (which, post quench, is also that of alpha prime) defined by this line of maximum solubility. At temperatures in the range of 760° to 788° C., and for the case of the 1.38 weight percent vanadium alloy, there is almost no volume percent delta, whereas in the case of the 2.1 weight percent vanadium alloy, the volume percent delta is 1.1%, determined by the lever rule {(2.1–1.2)/(86–1.2)} from the phase diagram in FIG. 5. Increasing this volume percent by a factor of about 3.7 giving a total volume percent delta of 4.1 percent does not change the particular embodiment of the invention. However, at hypereutectic compositions, the increasing volume percent delta gradually changes the properties from that of essentially almost all alpha prime to that of alpha prime plus delta by the simple rule of mixtures. It is at these compositions, those above the eutectic, that the invention is expected to have an upper bound.

In two phase hypereutectiod alloys below the eutectic, because the delta phase is present prior to quenching and in a form so as not to adversely effect the alpha prime (unlike the precipitates from an aging reaction), the rule of mixtures dictates that the final resultant properties are somewhere between 95.9% and 100% those of alpha prime plus the balance being that of delta. Note that in aging reactions in uranium alloys second phase precipitates such as $U_2Ti$ generally cause loss of ductility because they are inherently brittle and because of their morphology: they tend to grow at interlath positions between martensitic plates established during the gamma to alpha prime transformation. Whereas delta precipitates, which are themselves ductile and present prior to the transformation, do not adversely effect properties.

In the case of the 2.1 weight percent vanadium alloy cited above, the properties were 98.9% those of alpha prime and 1.1% those of delta, which is not distinguishable from that of 100% alpha prime, as shown in FIG. 4. This is essentially still true at the eutectic composition because the rule of mixtures indicates the properties are 0.959 times those of alpha prime plus 0.041 times those of delta. Since the properties of delta are not zero, this works out to be only about a 2% diminution in properties at the eutectic composition. This is approximately the line between a measurable difference and one that is not measurable. Therefore the method of volitionally designating the hardness and strength of the alloy involves both the solutionization temperature, being between gamma eutectiod and eutectic, as well as a composition between the gamma eutectoid and the eutectic. This invention pertains to these alloy compositions as well as a method of producing both all alpha prime and two phase (alpha prime plus delta) microstructures with hardnesses between 36 and 54 HRC.

This invention teaches the method of making a family of alloys of uranium and vanadium for structural and other uses where mechanical properties are important. Various other elements may also be present in small quantities without adversely affecting theses mechanical properties and thus these alloys would be included within this invention. Examples of elements that might be present in small amounts are: Mo, Ti, Zr, Nb, Hf, Al, Cu, Fe, Mn, Ni, Si, Mg, Ca, and others.

Elements that may be present from processing but may be detrimental at or below the following levels in weight parts per million (Wppm) are: H 5; and C, 100. These elements may be minimized by proper and well known processing techniques such as vacuum melting, vacuum solutionization and heat treating, and the use of proper crucibles and molds which minimize carbon pick-up etc.

EXAMPLES

Having generally set forth the family of alloys and the method of production of these alloys, the following examples are presented to illustrate preferred operable modes for carrying out the invention. These are illustrative and do not limit the invention; it is limited only by the claims. While the examples demonstrate specific compositions within the family of alloys, the full range of compositions between about the gamma eutectoid (1.0 percent by weight) and the eutectic (4.5 percent by weight) are contemplated as embodiments of the invention.

Example I

An alloy of uranium-1.38 percent vanadium by weight was prepared from 19.724 Kg of uranium metal and 0.276 Kg of vanadium metal by charging derby (uranium tetrafluoride reduction product) stock of depleted uranium and plates of vandium into a vacuum induction furnace (pressure=1 micron) with the vanadium on the bottom of a zirconia crucible, and after melting occurred, the alloy was poured over the top of the crucible into a yttria-coated graphite mold. Derby or direct ingot stock (also called dingot) was used because it is low in carbon. The ingot (20 kgm) was then remelted to facilitate mixing of these two elements with widely differing melting points and to aid the homogenization. A riser with daughter products was removed after a 24-hour decay period. The casting was homogenized for 100 hour under vacuum (pressure=1 micron) at 1010 degrees C., machined, and hot-worked by hammer-forging and then hot-rolled at 815 degrees C. to 3-mm-thick plates. Heating for hot-working was done under vacuum, but the deformation was done in air in under 60 seconds, to minimize scale formation. The hot-rolled plates were pickled in 50% $HNO_3$ (nitric acid) and 50% $_2H\,O$ solution. The final heat treatment at the solutionizing temperature ($T_s$), was done under vacuum on descaled plate segments (bars) 20×12 mm by 3 mm thick. Argon was introduced into the furnace while maintaining temperature, the specimen and specimen holder were removed by contacting only the holder with tongs, and water-quenching the bars within 1 second of exiting the furnace. The specimen holder consisted of an $Al_2O_3$ (alumina), asbestos-substitute insulating material in the form of a book with the central portion removed for the specimens, which was flipped open during flight, allowing only the bars (maintained at $T_s$) to enter the water-quench tank. The solutionization temperatures were all chosen to be between gamma-eutectoid (727° C.) and eutectic (1040° C.) temperatures. These were 760, 776, 788, 799, 816, 871, 927, 939, 954, 966, 982, and 1010 degrees C. One specimen of each composition, was solutionized at each $T_s$ which were held to within +/−3° C. The chemical analyses is given in Table 1. Nominally 10 readings per specimen were averaged to obtain Rockwell C hardness numbers (HRC) according to American Society for Testing and Materials (ASTM) Method E18 (Table 2).

TABLE 1

Chemical analysis of uranium-vanadium heat No 1196
(values are in Wppm except for V & U which are in weight percent)

| Element/Heat No. | 1196 |
| --- | --- |
| V | 1.38 |
| C | 55 |
| H | 0.20 |
| O | 20 |
| N | 50 |
| Fe | 105 |
| Al | 16 |
| Si | 150 |
| Mg | 5 |
| U | Bal. |

TABLE 2

Hardness Readings (HRC)# for Heat No. 1196 of U-1.38% V Alloy
After Solutionizing for 24 Hours at Temperature and Water-Quenching

| Solutionizing Temperature, °C. | Hardness, HRC |
| --- | --- |
| 760 | 52.0 |
| 776 | 51.7 |
| 788 | 49.2 |
| 799 | 52.0 |
| 816 | 50.4 |
| 871 | 52.2 |
| 927 | 51.6 |
| 939 | 51.2 |
| 954 | 49.5 |
| 966 | 51.2 |
| 982 | 51.2 |
| 1010 | 52.1 |

Values are averages of nominally 10 readins.

Example II

An alloy of uranium-2.10 percent vanadium by weight was prepared from 19.58 Kg of uranium metal and 0.42 Kg of vanadium metal in the same manner as in EXAMPLE I. The chemical analysis is given in table 3 and the hardnesses are given in table 4.

TABLE 3

Chemical analysis of uranium-vanadium heats No 1194
(values are in Wppm except for V & U which are in weight percent)

| Element/Heat No. | 1194 |
| --- | --- |
| V | 2.10 |
| C | 60 |
| H | 0.25 |
| O | 9 |
| N | 39 |
| Fe | 110 |
| Al | 15 |
| Si | 190 |
| Mg | 3 |
| U | Bal. |

TABLE 4

Hardness Readings (HRC)# for Heat No. 1194 of U-2.10% V Alloy
After Solutionizing for 24 Hours at Temperature and Water-Quenching

| Solutionizing Temperature, °C. | Hardness, HRC. |
| --- | --- |
| 760 | 52.9 |
| 776 | 52.6 |
| 788 | 51.5 |
| 799 | 50.4 |
| 816 | 49.4 |
| 871 | 46.8 |
| 927 | 43.1 |
| 939 | 41.7 |
| 954 | 41.7 |
| 966 | 40.9 |
| 982 | 42.2 |
| 1010 | 41.0 |

Values are averages of nominally 10 readings.

Example III

A third heat (No. 1187) with 2.0 percent vanadium by weight was prepared in a similar manner as in EXAMPLE II. This heat had a small amount of a third element (0.21 percent Al by weight) as an unintended element but otherwise the chemistry was similar to that of EXAMPLE II. This small amount of a third element did not change the response of the alloy or adversely effect the mechanical properties. This is demonstrated by the fact that the hardnesses after solutionization at temperatures of 982, 871, and 815 degrees C. for 1 hour and water-quenching were 41.3, 46.1, and 49.3 HRC, respectively, about the same as the averaged values for this temperature range in EXAMPLE II. Tensile properties after processing by solutionizing at 982 degrees C. for 1 hour and water-quenching were: 0.2% yield strength of 760 MPa, ultimate tensile strength of 1380 MPa, and percent elongation of 8.0%. The chemical analysis is given in table 5 and the hardnesses are given in table 6.

TABLE 5

Chemical analysis of uranium-vanadium Heat No. 1187
(values are in Wppm except for V & U which are in weight percent)

| Element/Heat No. | 1187 |
| --- | --- |
| V | 2 |
| C | 70 |
| H | 1 |
| O | 16 |
| N | 32 |
| Fe | 70 |
| Al | 2100 |
| Si | 280 |
| Mg | 3 |
| U | Bal. |

TABLE 6

Hardness Readings (HRC)# for Heat No. 1187 of U-2.0% V Alloy
After Solutionizing for 1 Hour at Temperature and Water-Quenching

| Solutionization Temperature, °C. | Hardness, HRC. |
| --- | --- |
| 815 | 49.3 |
| 871 | 46.1 |
| 982 | 41.3 |

Values are averages of nominally 10 readings.

These three examples demonstrated the method of producing alloys with the properties in FIG. 3 whereby volitionally designating the hardness and strength of the alloy involves both the solutionization temperature, being between gamma eutectiod and eutectic, as well as a composition between the gamma eutectoid and the eutectic. This invention pertains to these alloy compositions as well as a method of producing both all alpha prime and two phase (alpha prime plus delta) microstructures with hardnesses between 36 and 54 HRC.

Having described my invention, I claim:

1. A composition of matter comprising:
    a quenchable, essentially binary alloy of uranium and vanadium,
    wherein the amount of said vanadium has a predetermined value in the range from about 1.0 to 4.5 on a percent by weight basis,
    wherein the alloy has essentially a two phase microstructure selected from the group essentially consisting of alpha prime martensite and delta,
    and whereby the hardness has a predetermined value in the range of about 36 to 54 HRC in the as-quenched condition.

2. The composition of matter of claim 1, wherein the amount of the delta phase has a predetermined value in the range of about 0.00 to 4.1 percent on a volume basis.

3. The composition of matter of claim 1, wherein the amount of vanadium has a predetermined value in the range from about 1.0 to 2.5 percent on a weight basis.

4. The composition of matter of claim 1, wherein the vanadium has a predetermined value in the range of about 1.38 to 2.1 percent on a weight basis, and whereby the hardness has a predetermined value in the range of about 40 to 53 HRC.

5. The composition of matter of claim 1, wherein the amount of vanadium is about 1.38 percent by weight basis and whereby the hardness has a predetermined value in the range of about 51 to 54 HRC.

6. The composition of matter of claim 1, wherein the amount of vanadium is about 2.1 percent by weight basis, and whereby the hardness is in the range of about 40 to 54 HRC.

7. A composition of matter comprising:
    a quenchable, essentially binary alloy of uranium and vanadium, comprising;
        an essentially all martensitic microstructure, wherein the amount of said vanadium has a predetermined value in the range from about 1.0 to 2.5 on a percent by weight basis, and whereby the hardness has a predetermined value in the range of about 36 to 54 HRC in the as-quenched condition.

8. The composition of matter in accordance with claim 7, wherein the amount of vanadium has a predetermined value in the range of about 1.38 to 2.1 percent on a weight basis, and whereby the hardness has a predetermined value in the range of about 40 to 53 HRC.

9. The composition of matter in accordance with claim 7, wherein the vanadium is about 1.38 percent on a weight basis, and whereby the hardness is about 51 to 52 HRC.

10. The composition of matter in accordance with claim 7, wherein the vanadium is about 2.10 percent on a weight basis, and whereby the hardness is about 40 to 42 HRC.

11. A method for the production of an essentially binary alloy of uranium and vanadium comprising the steps of:
    charging depleted uranium stock and vanadium stock into a vacuum furnace,
    decreasing the pressure until it is about 1 micron,
    increasing the temperature until said alloy is molten,
    pouring said alloy to form a casting,
    remelting the alloy mixture and again casting the melt to form an ingot,
    homogenizing said casting at a pressure of about 1 micron and a temperature of 1010 degrees C. for 100 hours,
    hot-working at a temperature of 815 degrees C., and
    heat treating at a solutionizing temperature from about 727 to 1040 degrees C., water-quenching and recovering the product.

12. The method in accordance with claim 11, wherein the solutionization temperature is in the range of 760 to 1010 degrees C.

13. The method in accordance with claim 11, wherein the vanadium content has a predetermined value in the range of about 1.0 to 4.5 percent by weight basis.

14. The method in accordance with claim 11, wherein the vanadium content has a predetermined value of about 1.0 to 2.5 percent by weight basis.

15. The method in accordance with claim 11, wherein the vanadium content has a predetermined value of about 1.38 to 2.1 percent by weight basis.

16. The method in accordance with claim 11, wherein the vanadium content is about 1.38 percent by weight basis.

17. The method in accordance with claim 11, wherein the vanadium content is about 2.1 percent by weight basis.

18. The method in accordance with claim 16 or 17, wherein the solutionization temperature is 760 degrees C.

19. The method in accordance with claim 18, wherein the solutionization temperature is 1010 degrees C.

\* \* \* \* \*